(12) United States Patent
Muck

(10) Patent No.: US 11,547,098 B2
(45) Date of Patent: Jan. 10, 2023

(54) TERRARIUM OR AQUATERRARIUM

(71) Applicant: OASE Holding U.K. Limited, Southampton (GB)

(72) Inventor: Thorsten Muck, Ibbenbüren (DE)

(73) Assignee: OASE Holding U.K. Limited, Southampton (GB)

( * ) Notice: Subject to any disclaimer, the term of this patent is extended or adjusted under 35 U.S.C. 154(b) by 0 days.

(21) Appl. No.: 17/373,952

(22) Filed: Jul. 13, 2021

(65) Prior Publication Data

US 2022/0015337 A1 Jan. 20, 2022

(30) Foreign Application Priority Data

Jul. 14, 2020 (DE) ..................... 10 2020 118 579.0

(51) Int. Cl.
*A01K 63/06* (2006.01)

(52) U.S. Cl.
CPC ................................. *A01K 63/065* (2013.01)

(58) Field of Classification Search
CPC .... A01K 1/0052; A01K 1/0076; A01K 63/06; A01G 9/246; F24H 2250/06; F24H 2250/08
USPC .......................................................... 119/246
See application file for complete search history.

(56) References Cited

U.S. PATENT DOCUMENTS

| | | | | |
|---|---|---|---|---|
| 4,086,876 A * | 5/1978 | Moore | ................. | A01K 63/003 47/69 |
| 5,493,808 A * | 2/1996 | Munday | ................. | A01G 9/246 47/60 |
| 5,618,428 A * | 4/1997 | Oslund | ................. | A01K 63/045 210/617 |
| 6,431,118 B1 * | 8/2002 | Woltmann | ........... | A01K 63/006 261/153 |
| 6,564,010 B1 * | 5/2003 | Huang | ................. | A01K 63/065 62/3.7 |
| 8,689,739 B2 * | 4/2014 | Owens | ..................... | A01K 1/03 119/455 |
| 2003/0150394 A1 * | 8/2003 | Wolfe | ................. | A01K 63/042 119/246 |
| 2004/0194371 A1 * | 10/2004 | Kinnis | ................. | A01G 9/246 47/17 |
| 2008/0014857 A1 | 1/2008 | Spadafora et al. | | |
| 2010/0257878 A1 * | 10/2010 | Arbel | .................. | F24F 11/0008 165/59 |
| 2012/0137711 A1 | 6/2012 | Kakita et al. | | |
| 2013/0305605 A1 | 11/2013 | Wang | | |
| 2013/0319014 A1 * | 12/2013 | Heule | ..................... | F24D 3/00 62/3.3 |

(Continued)

FOREIGN PATENT DOCUMENTS

| | | |
|---|---|---|
| CN | 102 472 552 | 5/2012 |
| WO | 2015/012698 | 1/2015 |

*Primary Examiner* — Brady W Frazier
*Assistant Examiner* — Zoe Tam Tran
(74) *Attorney, Agent, or Firm* — Gudrun E. Huckett

(57) ABSTRACT

An (aqua)terrarium, in particular for ectothermic animals, has a container serving as living space. The (aqua)terrarium is provided with a climate control device that comprises a flow machine, in particular a fan, and an electrothermal converter, in particular a Peltier element. It is provided that the climate control device sucks in air from the container, conditions the sucked-in air by guiding it along a first side of the electrothermal converter, and conveys the conditioned air back into the container.

20 Claims, 5 Drawing Sheets

(56) References Cited

U.S. PATENT DOCUMENTS

2018/0279563 A1   10/2018  Wolfe et al.
2019/0254476 A1*  8/2019  Anthony .............. A47J 37/0629
2020/0187697 A1*  6/2020  Stewart ................ H05B 3/0076

* cited by examiner

TERRARIUM OR AQUATERRARIUM

BACKGROUND OF THE INVENTION

The invention concerns a terrarium or aquaterrarium, in particular for ectothermic animals, with a container serving as living space.

Terrariums as well as aquaterrariums are vivariums for keeping various, in particular exotic, animals and/or plants. In this context, an at least partially transparent container is provided as living space in which a piece of land, i.e., a piece of ground that can be walked on or planted, can be established. When in the fully established state of the vivarium, the proportion of land and/or of air space is predominant, one speaks of terrariums. On the other hand, one speaks of aquaterrariums when the water proportion dominates.

In the design of an (aqua)terrarium, it is generally attempted to simulate the natural habitat of the species to be kept as well as possible, wherein the focus is on providing suitable climatic conditions—such as temperature, air humidity and/or light conditions. In particular in case of keeping ectothermic animals, for example, reptiles which in contrast to mammals do not produce their own body heat and require external sources of heat or cold for regulating their body heat, an adequate temperature management is essential. If not provided, undercooling or overheating can lead to the animals becoming ill.

It is known in the prior art to regulate the temperature in (aqua)terrariums, for example, by heat lamps or heating wires which are focused on one point within the container. For warming up, ectothermic animals can move into the heat radiation zone of the respective heating medium. In general, heat lamps and heating wires are arranged inside of the container so that the animals are at risk of injury by direct contact. In addition, temperatures or temperature distributions within the (aqua)terrarium can only be adjusted with difficulty by heat lamps or heating wires. Also, heat lamps and heating wires are not compatible with misting systems for regulating the air humidity because the risk of electric shock cannot be excluded.

Object of the present invention is therefore to provide an improved possibility for regulating the climatic conditions of an (aqua)terrarium that comprises at least a temperature regulation.

SUMMARY OF THE INVENTION

This object is solved by an (aqua)terrarium, in particular for ectothermic animals, with a container serving as living space, characterized by a climate control device, comprising a flow machine, in particular a fan, and an electrothermal converter, in particular a Peltier element, wherein the climate control device sucks in air from the container, conditions the sucked-in air by guiding it along a first side of the electrothermal converter, and conveys the conditioned air back into the container.

The (aqua)terrarium according to the invention is characterized by a climate control device that comprises a flow machine, preferably a fan, as well as an electrothermal converter, in particular a Peltier element. In this context, the climate control device sucks in air from the container, conditions the sucked-in air by guiding it along a first side of the electrothermal converter, and conveys the conditioned air back into the container. The regulation of the temperature is realized thus at least partially by a conditioning of a circulating air flow. The thermoelectric converter that serves as a source of heat and/or cold must not be arranged directly in the container or oriented toward the container, which reduces the risk of injuries, for example, by heat/cold peaks or direct contact. Moreover, heat lamps and/or heating wires can be eliminated completely. In case that, under certain conditions, heat lamps and/or heating wires are still to be used as auxiliaries, they can be dimensioned smaller and/or at a greater distance, e.g. in areas of the (aqua)terrarium that are not accessible.

The flow machine generates a forced air flow which guides the air along the first side of the electrothermal converter. The electrothermal converter can be controlled in a simple manner in accordance with the respective requirements. By supplying a voltage to the two contacts of the electrothermal converter, in general direct current, its first side, for example, becomes hot, wherein the air that is guided along is heated. By simple reversal of the current direction, a switch from the heating mode to the cooling mode is effected. The first side of the converter becomes cold and cools the air guided along it.

In a preferred embodiment of the invention, the electrothermal converter is arranged outside of the container. In this way, the risk of injury, for example, by heat/cold peaks or direct contact is further reduced. The air flow which is generated by the flow machine in this case leads out of the container, across the electrothermal converter for the purpose of conditioning, and subsequently back into the container. Preferably, the electrothermal converter is arranged behind one of the walls of the container that delimits the living space, preferably a back wall that is not transparent.

Preferably, the flow machine is arranged outside of the container, preferably behind a wall of the container delimiting the living space, preferably a back wall that is not transparent. In this way, a risk of injury is counteracted because no movable parts of the flow machine are located within the container.

In a further preferred embodiment of the invention, at least the first side of the electrothermal converter is arranged at a right angle to the closest wall of the container delimiting the living space, in particular a sidewall or back wall. In this way, the first side is not directed directly toward the wall so that the latter is not heated too much, for example, in the heating mode, which otherwise could lead to injuries when touching the wall. The closest wall to the electrothermal converter is the wall that has the smallest distance to the converter, e.g. a sidewall or back wall behind which the converter is arranged. The closest wall can also be a bottom or a cover of the container.

In a further preferred embodiment of the invention, the climate control device comprises an air channel that at least partially, preferably completely, extends outside of the container, wherein the first side of the electrothermal converter or a cooling body which is connected thermally conductively to the first side forms a portion of the wall of the air channel. In this way, the air flow is guided optimally along the electrothermal converter. Moreover, a compact configuration of the climate control device is enabled. Preferably, the first side of the electrothermal converter comprises a cooling body, e.g. in the form of an attachment with cooling ribs that projects into the air channel. Due to the use of, for example, cooling ribs, the surface of the first side of the electrothermal converter is enlarged whereby the air is conditioned more efficiently. In particular, the air channel is designed such that at least in one section of the air channel, in which the electrothermal converter or a cooling body which is thermally conductively connected to its first side is located, a wall of the air channel does not contact the closest wall of the container, for example, a back wall of the container. In this way, an even better thermal separation between the heat/cold source and the container is achieved and the risk of injuries, for example, by heat/cold peaks or direct contact is further reduced in this way.

In a further preferred embodiment of the invention, the climate device comprises an inlet opening and an outlet opening toward the container, wherein the inlet opening is arranged in a lower region of the container and the outlet opening in an upper region of the container. In this way, an optimal circulation of the air can be achieved. Moreover, a temperature gradient along a vertical can be provided in this way so that in particular ectothermic animals in a correspondingly established (aqua)terrarium can regulate their body temperature by moving to a certain elevation. For example, warmer temperatures in the upper region to lower temperatures in the lower region of the container can be generated.

In this context, an upper half, in particular an upper third, preferably an upper fourth, of the container in relation to the total height of the container is referred to as upper region of the container. Moreover, a lower half, in particular a lower third, preferably a lower fourth, of the container in relation to the total height of the container is referred to as the lower region of the container. In particular, in case of a terrarium with water proportion or an (aqua)terrarium, the lower region and the upper region are not defined relative to the total height of the container but to a height shortened by a water level within the container, e.g. an air space height. Preferably, the inlet opening is arranged above a substrate forming a piece of land in the container or a water level. Preferably, the inlet opening as well as the outlet opening are arranged at a single side wall or back wall of the container.

In a further preferred embodiment of the invention, the climate control device comprises a heat discharge channel which extends outside of the container, wherein a second side of the electrothermal converter that is positioned opposite the first side of the electrothermal converter or an exhaust air cooling body connected thermally conductively to the second side forms a portion of the wall of the exhaust air channel. In this way, for example, in the cooling mode of the climate control device, the waste heat produced at the second side of the electrothermal converter can be discharged optimally into the environment. When the electrothermal converter is moreover arranged at a right angle to a closest wall, neither its first nor its second side are directly oriented toward the wall, which counteracts heating or cooling of the wall. Preferably, the heat discharge channel is provided with its own flow machine which improves a forced exhaust air flow and thus improves the heat discharge.

Preferably, the second side of the electrothermal converter comprises an exhaust air cooling body, e.g. in the form of an attachment with cooling ribs that projects into the heat exhaust air channel. In this way, the surface of the second side of the electrothermal converter is enlarged whereby the heat can be more efficiently discharged to the exhaust air.

In a further advantageous embodiment of the invention, the (aqua)terrarium comprises a control and regulating unit which is connected data-transmittingly to at least one temperature sensor and regulates the flow machine and/or the electrothermal converter. In this way, an automated temperature regulation within the container can be realized, whereby the risk of overheating or undercooling within the (aqua)terrarium is reduced. Thus, a nominal value or nominal value range can be preset in the control and regulating unit. A nominal/actual value comparison of the predetermined nominal values with actual values that are recorded within the container by the temperature sensor can serve as a decision making criterion regarding a control of the flow machine and/or of the electrothermal converter.

In a further preferred embodiment of the invention, the control and regulating unit is connected data-transmittingly to at least one air humidity sensor wherein the control and regulating unit controls a mister of the climate control device, in particular an ultrasonic mister with which water from a water reservoir of the climate control device can be converted to mist and can be discharged into the container for increasing the air humidity. The climate control device according to the invention, in contrast to heat lamps, can be combined without safety concerns with a misting system whereby the climate in the (aqua)terrarium can be regulated to a higher degree and the natural habitat of the species to be kept can be simulated even better in this way.

Preferably, the control and regulating unit is connected data-transmittingly at least to a first sensor that is at least embodied as a temperature sensor and to a second sensor that is at least embodied as a temperature sensor, wherein the first sensor is arranged in an upper region of the container and the second sensor is arranged in the lower region of the container. In this way, a temperature gradient can be measured along a vertical and can be used for improved regulation at least of the flow machine and/or of the electrothermal converter. Preferably, the first sensor is arranged substantially at the level of or above the outlet opening. Preferably, the second sensor is arranged below or substantially at the level of the inlet opening of the climate control device.

In a further preferred embodiment of the invention, the control and regulating unit is configured such that—in particular depending on the animal to be kept—a preprogrammed parameter configuration of climate-specific nominal values/value ranges is selectable that comprises at least a nominal temperature, preferably a nominal temperature range. In this way, the owner is able to quickly adjust an optimal climate in the (aqua)terrarium for his animal. For this purpose, he must only select the program that is provided for or fits the respective animal. In particular, a selection of programs is provided wherein the parameter configuration of a respective program is matched to a certain biome or corresponds to a certain biome that represents a natural living space for one or a plurality of animals to be kept. Since in this way the risk of faulty adjustments and resulting overheating or undercooling is minimized, such an (aqua)terrarium is suitable in particular for laypersons.

Preferably, the climate-specific nominal value/value ranges also comprise parameters for air humidity with which, for example, a misting system can be controlled.

In particular, the climate control device comprises further systems for influencing or simulation of further climate elements and/or conditions of the natural habitat of a species to be kept, such as ground heating for assisting temperature regulation, an irrigation system, an illumination or irradiation system (e.g. white lamps, RGB lamps and/or UV/IR lamps) and/or at least one loudspeaker for imitation of a natural acoustic environment. Preferably, the control and regulating unit is embodied for regulating at least one of the systems, in particular wherein a preprogrammed parameter configuration comprises corresponding climate-specific nominal values, e.g. irrigation intervals, illumination intervals/strengths and/or assigned audio files.

Particularly preferred, the control and regulating unit can be controlled by an app running on a data processing device, e.g., a home computer, a laptop, a tablet and/or a smart phone.

As a whole, the present invention provides an (aqua) terrarium with which an improved regulation of the climatic conditions in the container is achieved, in particular automated and matched to the respective animal to be kept. In this context, at least a temperature or a temperature gradient is influenced. In further embodiments of the invention, a natural habitat is imitated in a particularly high degree in that optionally moreover air humidity, irrigation, illumination and/or an acoustic environment are controlled.

It is expressly noted that the afore explained embodiments of the invention each independently, or in any arbitrary technically expedient combination also among each other, can be combined respectively with the subject matter of the independent claim.

BRIEF DESCRIPTION OF THE DRAWINGS

Modifications and embodiments of the invention as well as further advantages and details of the invention can be taken from the following description of the subject matter and the drawings.

Same or similar acting parts are identified—if expedient—with identical reference characters.

Figure 1:
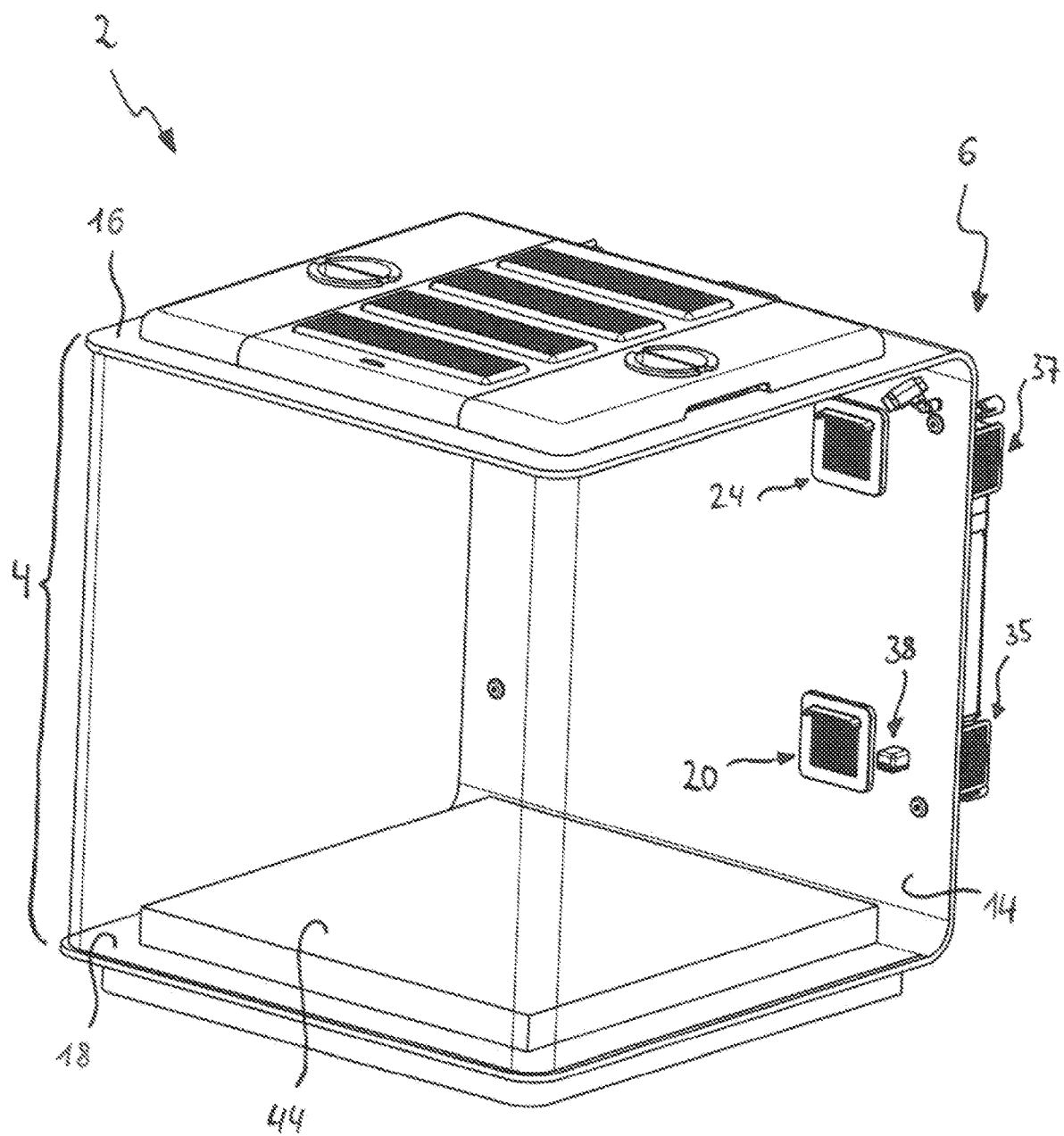
FIG. 1 shows schematically a terrarium according to the invention.

Individual technical features of the embodiments described in the following can also be combined in combination with the afore described embodiments as well as the features of the independent claims and possible further claims to articles according to the invention.

DESCRIPTION OF THE PREFERRED EMBODIMENTS

FIGS. 1 to 4a show different (partial) views of a terrarium 2 according to the invention with a container 4 of a substantially cuboid shape which is embodied as living space in particular for ectothermic animals. The living space is delimited by three neighboring transparent sidewalls, a back wall 14, a cover 16, as well as a bottom 18. The terrarium 2 is provided with a climate control device 6 which in the illustrated embodiment is arranged mostly behind the back wall 14 and is illustrated in more detail in FIGS. 3, 4, and 4a.

The climate control device 6 comprises a flow machine 8 (e.g. a fan) and an electrothermal converter 10, for example, in the form of a Peltier element. By means of the pressure differences generated by the flow machine 8, the climate control device 6 sucks air through an inlet opening 20 provided in the back wall 14 from the container 4 into an air channel 22. The sucked-in air 7 is guided within the air channel 22 along a first side 12 of the electrothermal converter 10 and is conditioned by it, i.e., depending on the operating mode (heating or cooling mode) is heated or cooled. The conditioned air 9 is conveyed through an outlet opening 24 provided in the back wall back into the container 4. In the container 4, warmer air 11 rises while colder air 13, 13' sinks. A temperature gradient along a vertical V is generated.

Figure 2:
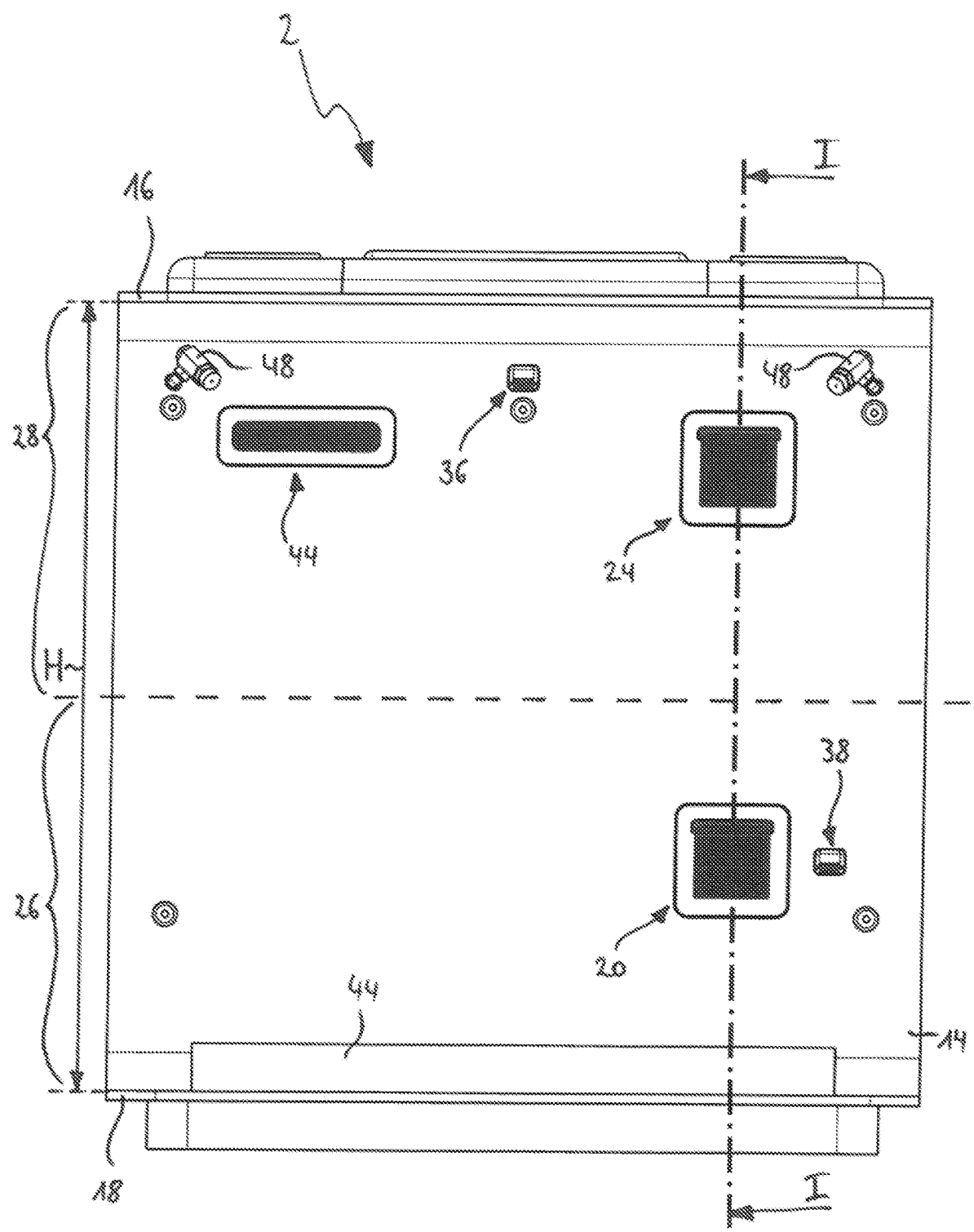
FIG. 2 shows schematically the terrarium according to the invention of FIG. 1 in a front view.
Figure 3:
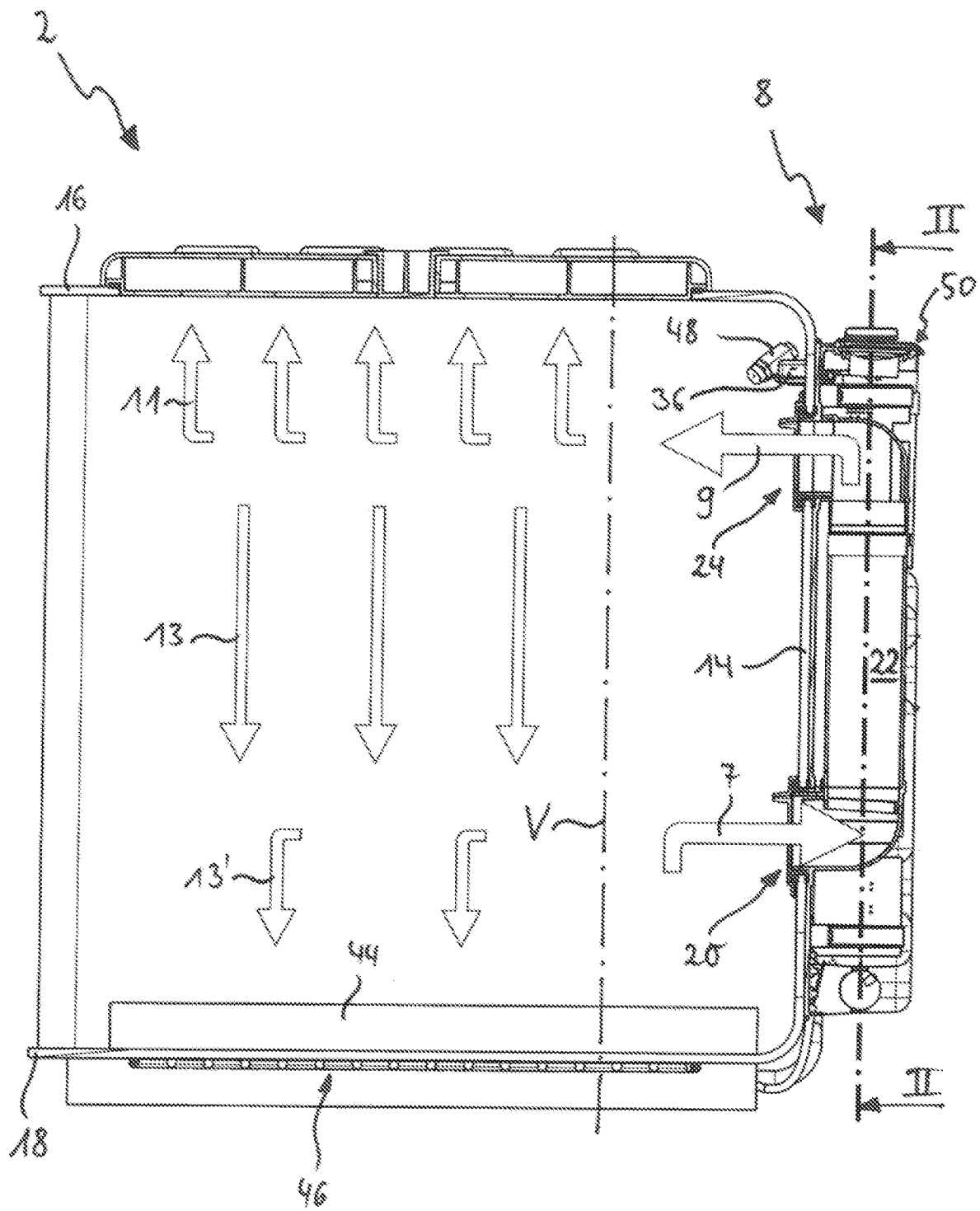
FIG. 3 shows schematically a section illustration of the terrarium according to the invention according to I-I of FIG. 2.

As can be seen in FIG. 2, the inlet opening 20 is arranged for this purpose in a lower region 26 and the outlet opening 24 in an upper region 28 of the container 4. In the present embodiment, the lower region 26 of the container 4 comprises the lower half of the container 4 in relation to a total height H of the container 4. Moreover, the upper region 28 comprises the upper half of the container in relation to its total height H. In alternative embodiments of the invention, such as terrariums with water proportions or (aqua)terrariums, the lower region 26 and the upper region 28 are not defined relative to the total height H of the container 4 but to a height shortened by a water level within the container 4, e.g. an air space height.

Figure 4:
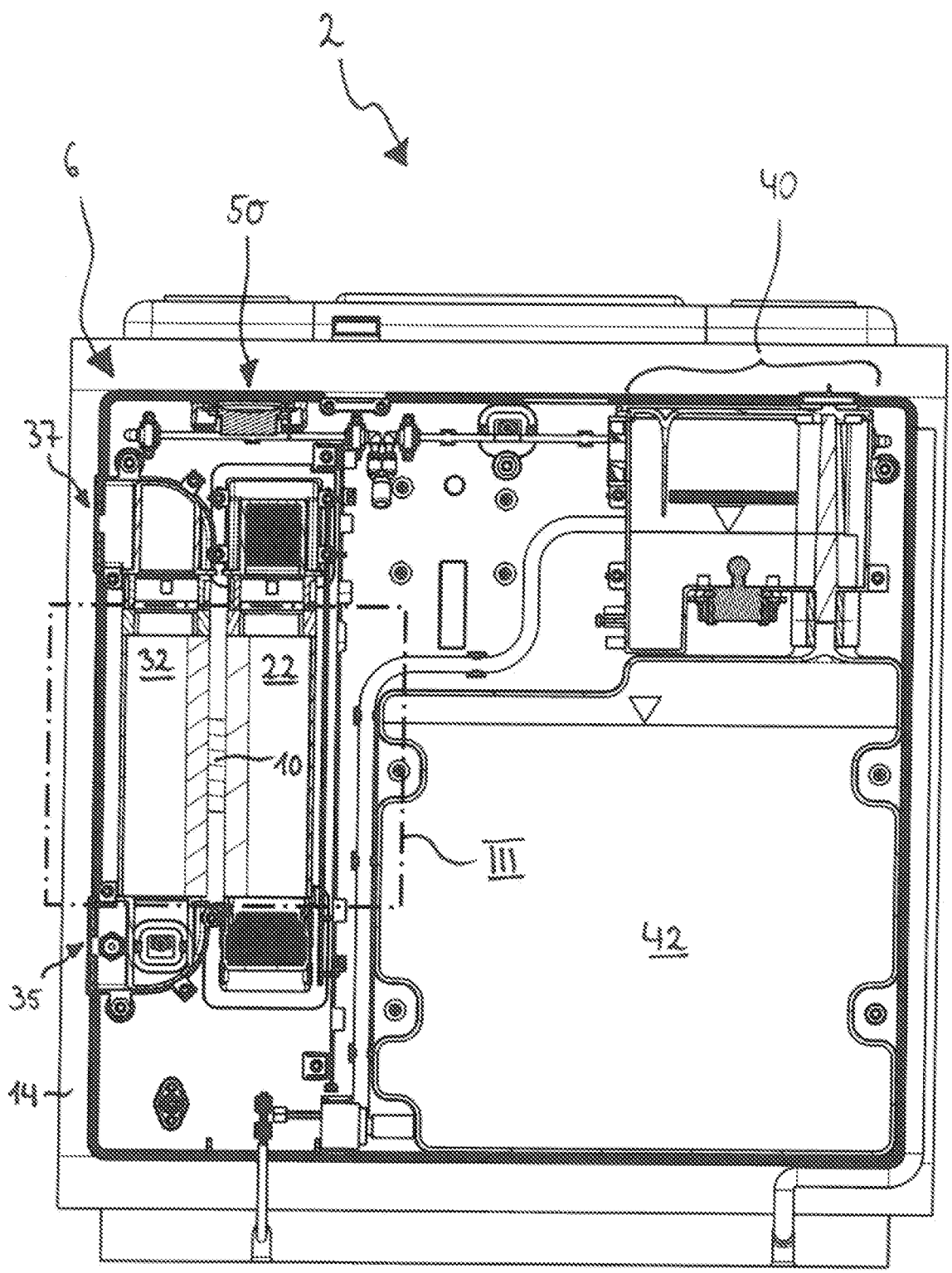
FIG. 4 shows schematically a section illustration of the terrarium according to the invention according to II-II of FIG. 3.
Figure 4A:
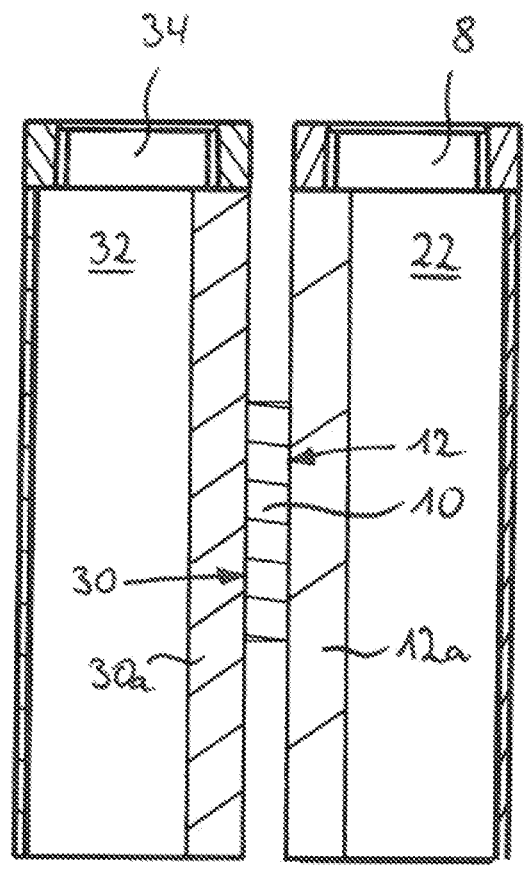
FIG. 4a shows schematically a detail enlargement of the detail III of FIG. 4.

As illustrated in FIG. 4a, in the present embodiment the first side 12 is provided with a cooling body 12a in the form of a thermally conductive attachment with cooling ribs that projects into the air channel 22. This cooling body 12a forms a portion of the wall of the air channel 22 wherein its side which is facing the electrothermal converter 10 closes off the air channel 22. This enables an efficient conditioning of the air while requiring only little installation space.

In the cooling mode, i.e., when the electrothermal converter 10 is supplied with current such that the first side 12 becomes cold, heat is produced on a second side 30 of the electrothermal converter 10 which is positioned opposite to its first side 12. For improved discharge of this heat, the climate control device 6 comprises a heat discharge air channel 32 that extends outside of the container 4. The second side 30 of the electrothermal converter 10 forms in this context a portion of the wall of the heat discharge air channel 32. The second side 30 comprises an exhaust air cooling body 30a in the form of an attachment with cooling ribs that projects into the heat discharge air channel 32. An exhaust air flow machine 34, for example, in the form of a fan, produces an exhaust air flow which assists in heat discharge. An exhaust air inlet opening 35 and an exhaust air outlet opening 37 of the heat exhaust air channel 32 are not open toward the container 4 but suck in air from the environment and release it again into the environment.

The electrothermal converter 10 which is embodied in the present embodiment substantially in a plate shape is arranged at a right angle to the back wall 14 which represents a closest wall of the terrarium 2. In this way, neither the first side 12 nor the second side 30 of the electrothermal converter 10 is oriented directly toward the back wall 14 so that it is not heated too strongly either in the heating mode by the first side 12 (heating energy) nor in the cooling mode by the second side 30 (waste heat). Instead, due to the special arrangement of the electrothermal converter 10 between the air channel 22 and the heat discharge air channel 32, which extend parallel to each other at least in their respective sections in which a portion of their wall is formed by the electrothermal converter 10, the cold as well as the heat is optimally transported away in any operating mode. This is even further reinforced by the employed cooling bodies 12a, 30.

The terrarium 2 comprises a control and regulating unit, not illustrated in more detail in the drawings, which is connected data-transmittingly to a first sensor 36 as well as a second sensor 38. The first sensor 36 is arranged in an upper region 28 of the container while the second sensor 38 is arranged in a lower region 26 of the container 4. Both sensors 36, 38 are embodied as 2-in-1 combination sensors for measuring the temperature as well as the air humidity. In this way, the climate in the terrarium 2 can be regulated to a greater degree and the natural habitat of the species to be kept can be simulated even better in this way. The control and regulating unit regulates the flow machine 8 as well as the thermoelectrical converter 6, wherein a predetermined nominal value or nominal value range can be preset in the control and regulating unit. A nominal/actual value comparison of the predetermined nominal values with actual values recorded within the container 4 by at least one of the sensors 36, 38 can serve as a decision making criterion regarding a control of the electrothermal converter 6 and/or the flow machine 8.

In the present embodiment, the control and regulating unit comprises moreover a mister 40 with which water from a water reservoir 42 can be converted to mist and can be discharged through a mister opening 44 into the container 4 for increasing the air humidity.

For optimal and comfortable adjustment of the climate within the terrarium 2, the control and regulating unit is designed such that, as a function of the animal to be kept, a preprogrammed parameter configuration of climate-specific nominal values can be selected which comprise at least a nominal temperature. In this way, for example, by means of a smartphone or another data processing device, the biome that is to be simulated for the respective animal species can be selected via app. In the control and regulating unit a parameter configuration is assigned to the selected biome so that the control and regulating unit controls the climate control device 6 and can adapt the climate conditions in the terrarium 2 in this way optimally to the natural habitat of the animal to be kept.

The control and regulating unit can be combined also with additional systems of the climate control device 6. In the illustrated embodiment, the control and regulating unit regulates a ground heater 46 connected thermally to a bottom plate 44 of the container for assisting in temperature regulation, an irrigation system that comprises two irrigation nozzles 48 arranged in the upper region 28 of the container 4, as well as a loudspeaker 50 for imitation of a natural acoustic environment.

What is claimed is:

1. A terrarium or an aquaterrarium comprising:
   a container comprising a living space including an air space;
   a climate control device comprising a flow machine and a thermoelectric converter, wherein the climate control device is configured to suck in air from the air space of the container, to condition the air that is sucked in from the air space of the container by guiding the air along a first side of the thermoelectric converter, and to convey the air back into the air space of the container after having been guided along the first side of the thermoelectric converter;
   wherein the climate control device is arranged at the container and has a weight, wherein the climate control device is supported with the weight thereof at the container.

2. The terrarium or the aquaterrarium according to claim 1, wherein the flow machine and the thermoelectric converter are arranged outside of the container.

3. The terrarium or the aquaterrarium according to claim 1, wherein the flow machine is arranged outside of the container.

4. The terrarium or the aquaterrarium according to claim 1, wherein the thermoelectric converter is arranged outside of the container.

5. The terrarium or the aquaterrarium according to claim 1, wherein the first side of the thermoelectric converter is arranged at a right angle to a closest wall of the container.

6. The terrarium or the aquaterrarium according to claim 1, wherein the climate control device comprises an air channel that extends at least partially outside of the container.

7. The terrarium or the aquaterrarium according to claim 6, wherein the first side of the thermoelectric converter forms a portion of a wall of the air channel.

8. The terrarium or the aquaterrarium according to claim 6, further comprising a cooling body thermally conductingly connected to the first side of the thermoelectric converter and forming a portion of a wall of the air channel.

9. The terrarium or the aquaterrarium according to claim 1, wherein the climate control device comprises an inlet opening that opens into the air space of the container and an outlet opening that opens into the air space of the container, wherein the inlet opening is arranged in a lower region of the container, and wherein the outlet opening is arranged in an upper region of the container.

10. The terrarium or the aquaterrarium according to claim 1, wherein the climate control device comprises a heat discharge air channel that extends outside of the container.

11. The terrarium or the aquaterrarium according to claim 10, wherein the thermoelectric converter comprises a second side that is positioned opposite to the first side of the thermoelectric converter, wherein the second side of the thermoelectric converter forms a portion of the wall of the heat discharge air channel.

12. The terrarium or the aquaterrarium according to claim 10, further comprising an exhaust air cooling body that is thermally conductively connected to the second side of the thermoelectric converter and forms a portion of the wall of the heat discharge air channel.

13. The terrarium or the aquaterrarium according to claim 1, further comprising one or more temperature sensors arranged in the container, and further comprising a control and regulating unit connected data-transmittingly to the one or more temperature sensors, wherein the control and regulating unit is configured to regulate the flow machine and/or the thermoelectric converter.

14. The terrarium or the aquaterrarium according to claim 13, further comprising at least one air humidity sensor, wherein the control and regulating unit is connected data-transmittingly to the at least one air humidity sensor and is configured to regulate a mister of the climate control device, wherein the mister is configured to convert water from a water reservoir of the climate control device into mist and to discharge the mist into the air space of the container for increasing an air humidity in the air space of the container.

15. The terrarium or the aquaterrarium according to claim 14, wherein the mister is an ultrasonic mister.

16. The terrarium or the aquaterrarium according to claim 13, wherein the one or more temperature sensors include a first temperature sensor and a second temperature sensor, wherein the first temperature sensor is arranged in an upper region of the container, and wherein the second temperature sensor is arranged in a lower region of the container.

17. The terrarium or the aquaterrarium according to claim 13, wherein the control and regulating unit is configured such that, depending on an animal to be kept in the living space, a preprogrammed parameter configuration of climate-specific nominal values is selectable and the preprogrammed parameter configuration comprises at least a nominal temperature or a nominal temperature range.

18. The terrarium or the aquaterrarium according to claim 1, wherein the flow machine is a fan.

19. The terrarium or the aquaterrarium according to claim 1, wherein the thermoelectric converter is a Peltier element.

20. The terrarium or the aquaterrarium according to claim 1, wherein the climate control device is fastened to a back wall of the container and is supported with the weight thereof at the back wall of the container.

\* \* \* \* \*